United States Patent
Vishnia-Shabtai et al.

(10) Patent No.: US 7,738,497 B2
(45) Date of Patent: Jun. 15, 2010

(54) SYSTEM AND METHOD FOR DYNAMICALLY MODIFYING SYNCHRONIZED BUSINESS INFORMATION SERVER INTERFACES

(75) Inventors: Nimrod Vishnia-Shabtai, Kdar Vrasim (IL); Sachar Sagi, Karmiel (IL)

(73) Assignee: SAP, AG, Walldorf (DE)

( * ) Notice: Subject to any disclaimer, the term of this patent is extended or adjusted under 35 U.S.C. 154(b) by 649 days.

(21) Appl. No.: 10/990,294

(22) Filed: Nov. 15, 2004

(65) Prior Publication Data

US 2007/0061427 A1    Mar. 15, 2007

(51) Int. Cl.
  *H04J 3/06*    (2006.01)
(52) U.S. Cl. .................. 370/503; 709/221; 715/735
(58) Field of Classification Search .............. 370/350, 370/503; 709/220, 221, 223, 246; 715/255, 715/735
  See application file for complete search history.

(56) References Cited

U.S. PATENT DOCUMENTS

| | | | |
|---|---|---|---|
| 6,341,316 B1 * | 1/2002 | Kloba et al. | 709/248 |
| 6,466,947 B2 * | 10/2002 | Arnold et al. | 707/104.1 |
| 7,275,243 B2 * | 9/2007 | Gibbons et al. | 717/159 |
| 7,350,226 B2 * | 3/2008 | Moriconi et al. | 726/1 |

* cited by examiner

*Primary Examiner*—Jason E Mattis
*Assistant Examiner*—Dady Chery
(74) *Attorney, Agent, or Firm*—Dalina Law Group, P.C.

(57) ABSTRACT

One or more embodiments of the invention enable data that is synchronized between businesses to be transferred to any desired data pool or data pool version in a format that may be declaratively specified and dynamically altered to meet the needs of the specific data pool or data pool version. The data pool vendor utilized by a company or the attributes and formats used in communicating with a particular data pool may change over time and embodiments of the invention are capable of automatically detecting and altering the data and format of the data to be transferred to and from the data pool. The server interface configuration may comprise an XML file in one embodiment of the invention. The XML file may be parsed with any compliant schema based or DTD based XML parser and sent to the server interface for dynamic update using JMS for example. The server interface itself may be implemented or make use of a Resource Adapter configured to operate within the Java Connector Architecture of the Enterprise JavaBeans specification. In at least one embodiment of the invention an N-tier architecture may be employed comprising an Application Server. The server interface accepts an incoming server interface configuration request and utilizes information derived from the XML configuration file in order to add or remove data attributes or alter the format of the data attributes that are transferred to and from each data pool. In this embodiment of the invention, data pools may be switched by at run-time without recompiling and redistributing the application.

7 Claims, 5 Drawing Sheets

FIGURE 3

```
<globalTradeItemNumber>
...
<informationProvider>
   <nameOfInformationProvider> ...
...
...
<netWeight>Measurement/5.3</netWeight>
<unitsSpecific>AN/2</unitsSpecific>
<notToExceedWeight>AN/2</notToExceedWeight>
...
...
```

300

SYSTEM AND METHOD FOR DYNAMICALLY MODIFYING SYNCHRONIZED BUSINESS INFORMATION SERVER INTERFACES

BACKGROUND OF THE INVENTION

1. Field of the Invention

Embodiments of the invention described herein pertain to the field of computer software. More particularly, but not by way of limitation, one or more embodiments of the invention enable the declarative specification and dynamic updating of synchronized business information server interfaces to alter the format used in communicating with a specific data pool.

2. Description of the Related Art

The global distribution and procurement of products from manufacturers to retailers depends on the efficient exchange of information between parties involved in the supply chain. For instance, the synchronization of information that uniquely describes a product or service exchanged between trading partners is fundamental to building collaborative commercial relationships among retailers, manufacturers, and other supply chain participants. Various systems exist for synchronizing such business-to-business information between trading partners. These systems, often referred to as Global Data Synchronization (GDS) systems, are important because effective GDS systems lead to consolidation and management of master product data, which greatly increases internal supply chain efficiency. Many also consider GDS as a fundamental building block for realizing the full potential of Radio Frequency Identification (RFID) and Electronic Product Code (EPC) tags on various product configurations (e.g., pallets and cases of a particular product). GDS and EPC initiatives are designed to work together to improve business performance amongst a set of interrelated trading partners through the sharing of well-formed data that describes information associated with a set of products or services.

Business information is exchanged via repositories known as data pools that act as an interface point between supply chain entities such as manufacturers and retailers. These data pools provide a message-based framework for synchronizing item, organization and pricing data. For instance, manufacturers publish data to the data pool in accordance with a set of specific rules defined by the data pool and other parties such as retailers or other manufactures subscribed to the data pool are kept in sync with information published to the data pool.

Manufacturers publish business information to data pools and retailers subscribe to business information from data pools after the existence of a product is made known to a global directory of products known as the "Global Registry". The global registry may then be employed by retailers to find a product and lookup the basic parameters of a product. The lookup generally includes the location of the data pool where the full product information can be found. The predominant registry in the industry is known as the "GS1 Global Registry™". The Global Registry stores unique product identifiers (referred to as GTINs and discussed in further detail below) and location information about each of the respective parties in the supply chain (e.g., Global Location Numbers called GLNs and also discussed in more detail below). Put generally a GTIN describes what an item is and a GLN describes who has and where the item is located. The association of data pools and the Global Registry described herein are known as the Global Data Synchronization Network (GDSN).

The steps involved in exchanging business information via data pools and the global registry are as follows. First internal supplier data is reviewed and if necessary modified to conform to generally accepted standards. For instance, each product or unit of sale is given a GTIN. The GTIN provides a basis for identifying when a unit of sale passes through a retail point of sale, is delivered, ordered, invoiced, or is otherwise involved in a transaction. A GTIN comprises up to 14 digits and can be associated with raw materials or completed end user products and may also include services. The number allocated to a product needs to be communicated from the manufacturer through the supply chain in advance of transaction, so that business transactions can be set up.

A supplier of business information may also define information that uniquely identifies itself and other legal entities, trading parties and locations considered part of or needing access to supply chain information. This identifying information, typically referred to as a Global Location Number (GLN), provides a standard means of identification. The GLN is simply a 13-digit number used to uniquely identify any legal, functional or physical entity. Some examples of parties and locations that can be identified with GLNs, include but are not limited to, functional entities such as a purchasing department or customer number within a legal entity, an accounting department, a returns department, a nursing station, or any other group that performs a definable set of functions. GLNs may also act as a mechanism for identifying physical entities such as a particular room or section of a building, a warehouse, or aspects of a physical location such as a loading dock, delivery point, cabinet, or other location specific information. It is also feasible to utilize GLNs to identify buyers, sellers, companies, subsidiaries or divisions such as suppliers, customers, financial services companies, or any other entity or trading partner.

After business data is formatted for a given source data pool, it may then be uploaded to a source data pool. There are various data pools and each data pool has mandatory and optional aspects. For instance, a data pool may collect descriptive data that contains a standardized set of attributes, values, trade item information, trading partner information, product and packaging information (e.g., shipping unit information such as a pallet), consumer unit (e.g., typically a trade item in its retail form). In at least one instance attributes are used as a mechanism to name associated data (e.g., Color) and values identify the data itself associated to the attribute name (e.g., Blue). Both attributes and values can be recursive and thereby identified as a repeatable attribute/value. Any product or service having a need to retrieve pre-defined information that may be priced, ordered or invoiced at any point in any supply chain is typically referred to as a trade item. In this context, the term consumer unit is intended to indicate to the retailer that a particular item should be considered as a potential unit of sale.

In order to provide end users with a single point of entry in which to exchange business data, each data pool sends basic information about the uploaded data to the Global Registry without end user intervention. The information sent to the global registry holds the basic information and as well as the location of the supplier's data pool. Customers may search the Global Registry via their own destination data pool for information about the supplier that the customer may wish to obtain as part of its subscription to the destination data pool.

Trading partners perform the publication and subscription process for sending and receiving information via a synchronization engine that synchronizes information between each of the respective data pools. The synchronization engine allows each trading partner to maintain a single point of entry to its chosen data pool. Once implemented, GDS allows for the continuous updating of data attributes related to products for example between a plurality of computing systems in order to ensure that the data is kept identical in all locations that access the data. This synchronization process occurs in order to keep businesses up to date with changes and modifications to products and prices for example. The proper update of product data also enables a more efficient supply chain and eliminates transactions with erroneous prices or discontinued products for example.

The process of reviewing and publishing items for retail trading partners by manufacturers is in most cases a laborious process that involves development of customized applications that obtain the relevant information from the manufacture side and provide that information to the data pool in a publishable form. In addition, current systems employed in the field of global data synchronization suffer from hardcoded server interfaces that embed references to hardcoded data elements within the control logic of the application. Mixing server interface code with control logic, business logic and hardcoded data and message formats yields higher maintenance costs and increases the likelihood of errors. Furthermore, the time required to update an application is significant in that the server interface itself must be altered and sent to all users that require the modification. There is no product on the Global Synchronization Data Network market that allows for dynamic construction of server interfaces in a declarative manner. In addition, large maintenance efforts are required by a company when the format or number of parameters required by a data pool changes or when a vendor switches allegiance to another data pool. The back end processing software and server interface requires modification or a total rewrite depending on the nature of the new data pool or data pool format. Because of these and other limitations present in current systems there is a need for a dynamic server interface that is easily adjusted to interface with different data pools and can allow for users to edit declarative definitions for the server interfaces without requiring recompilation and redistribution of an application. This enables installation employees and consultants to deal with the customer specific data issues without struggling with global data synchronization issues that embodiments of the system inherently handle.

SUMMARY OF THE INVENTION

One or more embodiments of the invention enable data that is synchronized between businesses to be transferred to any desired data pool or data pool version in a format that may be declaratively specified and dynamically altered to meet the needs of the specific data pool or data pool version. The declarative server interface configurations may be dynamically altered to meet the needs of any data pool or data pool version. The ability to specify and alter a declarative server interface for example by editing an XML configuration file that is human readable allows for rapid coupling with a data pool and rapid updating of an application to meet a modification to the data pool formats. Rapid coupling to a data pool also allows for installation personnel to focus on structuring user data to comply with the data pool rather than with implementing communications protocols or application server installation issues thereby reducing the skill set required for the installation personnel. By lowering the required skill set for the installation personnel a company saves money by hiring lower wage workers to install the system.

Although a given user of a data pool usually only interfaces with one data pool, over time the data pool vendor may be replaced or the attributes and formats used in communicating with a particular data pool may change. One or more embodiments of the invention are capable of automatically detecting and altering the data and format of the data to be transferred to and from the data pool. Embodiments of the invention utilize a server interface configuration that may be dynamically altered that describes the attributes and format of each attribute as required by the data pool.

The server interface configuration may comprise an XML file in one embodiment of the invention. The XML file may be parsed with any compliant schema based or DTD based XML parser and sent to the server interface for dynamic update using JMS for example. The server interface itself may be implemented as a Resource Adapter configured to operate within the Java Connector Architecture of the Enterprise JavaBeans specification. Any communications methodology allowed by Enterprise Java in communicating with a resource adapter may be utilized in Enterprise Java related embodiments of the invention. Other embodiments of the invention may utilize other competing middleware technologies in keeping with the spirit of the invention.

In at least one embodiment of the invention an N-tier architecture may be employed comprising an Application Server. The server interface accepts an incoming server interface configuration request and utilizes information derived from the XML configuration file in order to add or remove data attributes or alter the format of the data attributes that are transferred to each data pool. In this embodiment of the invention, data pools may be switched at run-time without recompiling and redistributing the application.

On startup, the systems implementing one or more embodiments of the invention open a server interface configuration. The server interface configuration may be an XML file in one or more embodiments of the invention. The server interface configuration file is then read for declarative definitions of the data attributes and message formats required for sending information to a given data pool and for receiving from a given data pool. Processing loops until all items describing the interface have been parsed and cached for quick access at run-time.

The messages sent to and from a data pool may be sent from a component through a communications element to a server interface that forwards the messages using a data pool communications protocol. For example, an EJB component may send a message to a message queue communications element to a server interface that forwards a message to a data pool using the AS2 communications protocol. Alternatively an EJB component may instantiate a resource adapter that communicates with a data pool using an alternative communications protocol. A server interface that utilizes dynamic server configurations with other communications elements, component types and data pool communications protocols is in keeping with the spirit of the invention.

BRIEF DESCRIPTION OF THE DRAWINGS

FIG. 3 illustrates an XML embodiment of a message definition in a server interface configuration comprising a new data attribute.

DETAILED DESCRIPTION OF THE INVENTION

A system and method for dynamically modifying synchronized business information server interfaces will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention enable data that is synchronized between businesses to be transferred to any desired data pool or data pool version in a format that may be declaratively specified and dynamically altered to meet the needs of the specific data pool or data pool version. The data pool vendor utilized by a company or the attributes and formats used in communicating with a particular data pool may change over time. One or more embodiments of the invention are capable of automatically detecting the changes to the server interface configuration and altering the data and format of the data transferred to and from a data pool.

The server interface configuration may comprise an XML file in one embodiment of the invention. The XML file may be parsed with any compliant schema based or DTD based XML parser and read by the server interface at initialization time or sent to the server interface for dynamic update using JMS for example. The server interface itself may be implemented as a Resource Adapter configured to operate within the Java Connector Architecture of the Enterprise JavaBeans specification. Any communications methodology allowed by Enterprise Java in communicating with a resource adapter may be utilized in Enterprise Java related embodiments of the invention. In at least one embodiment of the invention an N-tier architecture may be employed comprising an Application Server. The server interface accepts an incoming server interface configuration request and utilizes information obtained from the XML configuration file in order to add or remove data attributes or alter the format of the data attributes that are transferred to each data pool. In this embodiment of the invention, data pools may be switched at run-time without recompiling and redistributing the application.

Figure 1:
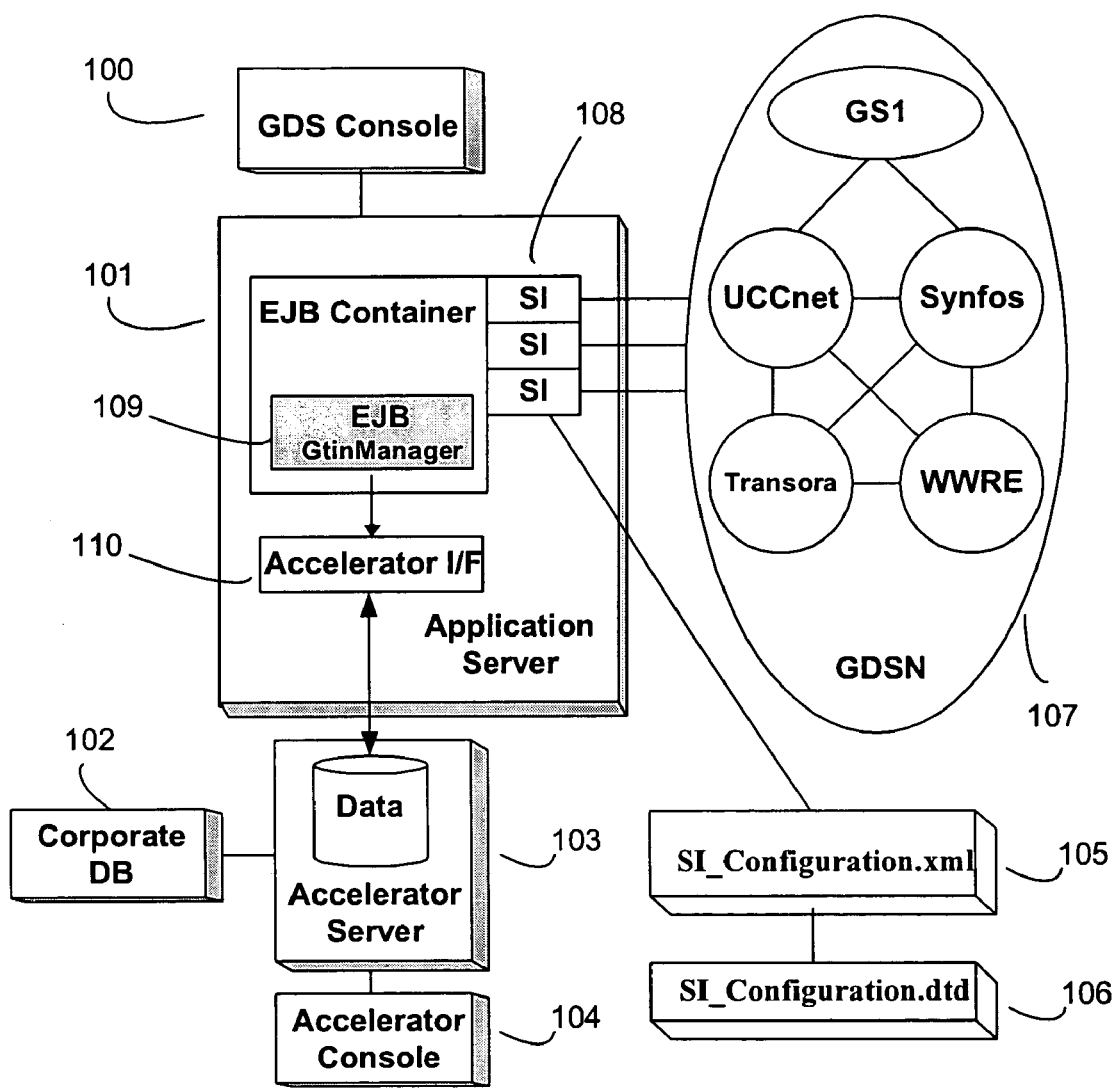
FIG. 1 is an architectural illustration of an embodiment of the invention comprising an application server, an accelerator server hosting a product content management (PCM) database, a corporate database server and various data pools that are members of the GDSN.

FIG. 1 is an architectural diagram of an embodiment of the invention utilizing an N-tier architecture comprising Accelerator Server 103 hosting a product content management (PCM) database, application server 101, accelerator console 104, GDS console 100, corporate database system 102, server interface instances 108 and data pools within GDSN 107 such as UCCnet and Transora. The architecture shown in FIG. 1 is utilized to synchronize business data with the outside world, i.e., the data pools of FIG. 1, namely UCCnet, Transora and other data pools that are a part GDSN 107. Corporate database system 102 may couple with as many enterprise information systems as an organization comprises in order to synchronize all data within an enterprise. When the desired product data is in product content management database system of Accelerator Server 103, it may be accessed through GDS console 100 via GtinManager EJB 109 via accelerator interface 110. Communication between application server 101 and the various data pools within the GDSN occur via Server Interface instances (SI) 108. Server interface configuration files 105 and 106 are read by one of Server Interface instances 108 for example in order to determine the specific data attributes and formats which to communicate with a given data pool for the messages that a data pool requires.

A Server Interface instance may obtain a server interface configuration file in any number of ways such as obtaining the file at initialization or during run-time via JMS or as a web service or any other mechanism of transferring a description of the required data pool data attributes and formats. The architecture of FIG. 1 is applicable to both as manufacturers and retailers that read and write to the GDSN. The ability for a given SI to switch formats during run-time gives the system a lower cost of maintenance and higher speed with which modifications are available to each side of the GDSN.

Figure 2A:
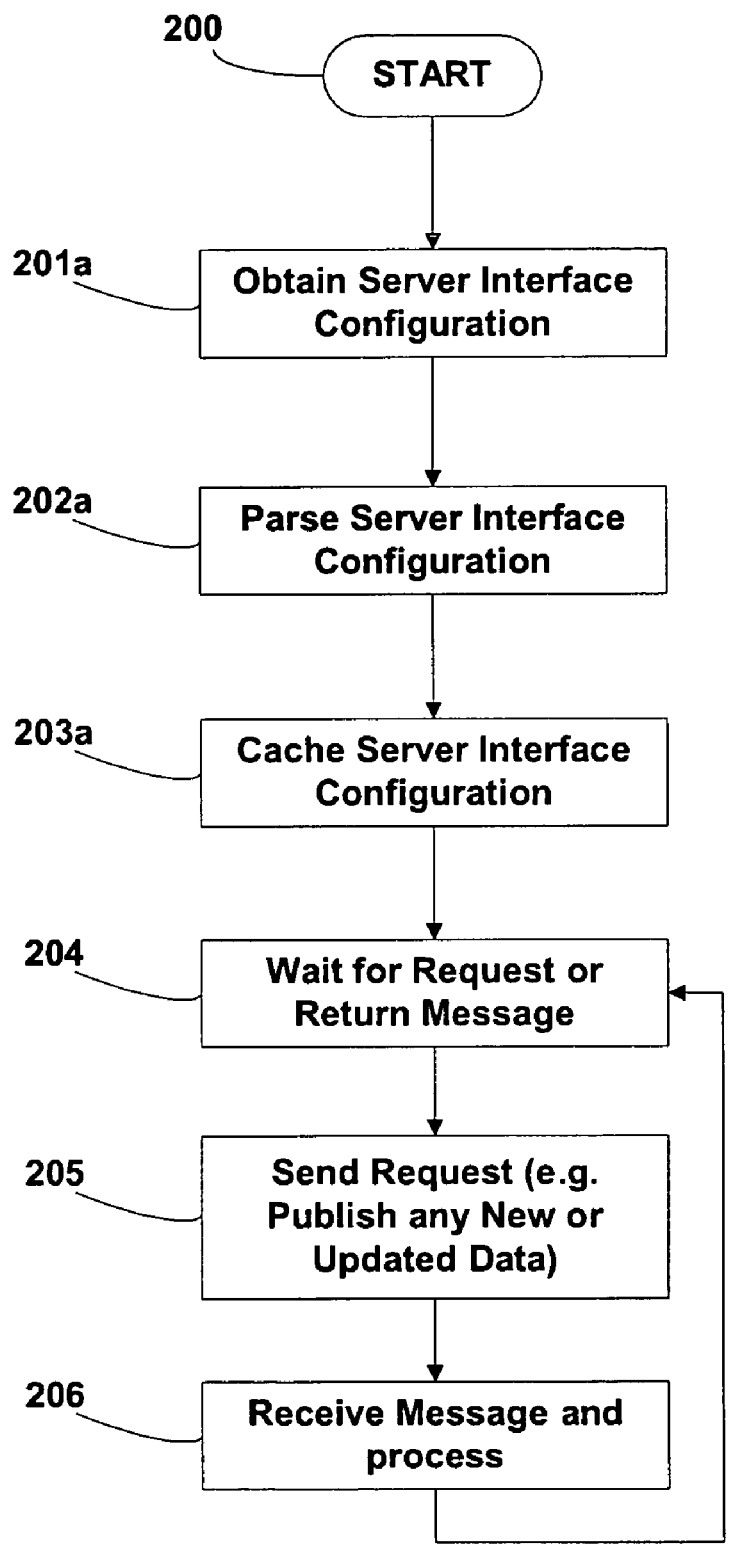
FIG. 2A illustrates a flow chart describing publication of data after obtaining a declarative server interface configuration.

FIG. 2A illustrates a flow chart describing publication of data after obtaining a declarative server interface configuration for example at initialization time. Each server interface obtains a server interface configuration at 201a. A server interface configuration may comprise any data that describes a server interface, for example an XML file describing the interface to a data pool. The interface to a data pool involves the messages and formats of the messages that are sent between the Server Interface instances 108 and a given data pool. The server interface configuration is parsed at 202a with any DTD or Schema compliant XML parser. The resulting information derived from parsing the server interface configuration is cached in memory at 203a for quick access when communicating via the server interface. When a user commands the system in a manner that involves transmitting data with a data pool, messages sent from the server interface to the data pool are formatted according to the cached server interface configuration. When a request for communication, for example a publication request by a user or automated system occurs, a server instance that has been initialized and is ready or waiting for an invocation at 204 performs the requested operation, in this case for example a publish request at 205. This process of sending requests such as the example publication request occurs forever until the server interface is deactivated. Messages received from the data pool at 206 are processed and may be parsed with incoming data stored in product content management system hosted on Accelerator Server 103 or alternatively the messages may be used to update the state of the last request and/or may be returned to GDS console 100 depending on the message. Messages returned to GDS console 100 are returned via Server Interface instance 108 and EJB GtinManager 109 hosted on application server 101 in one or more embodiments of the invention.

Figure 2B:
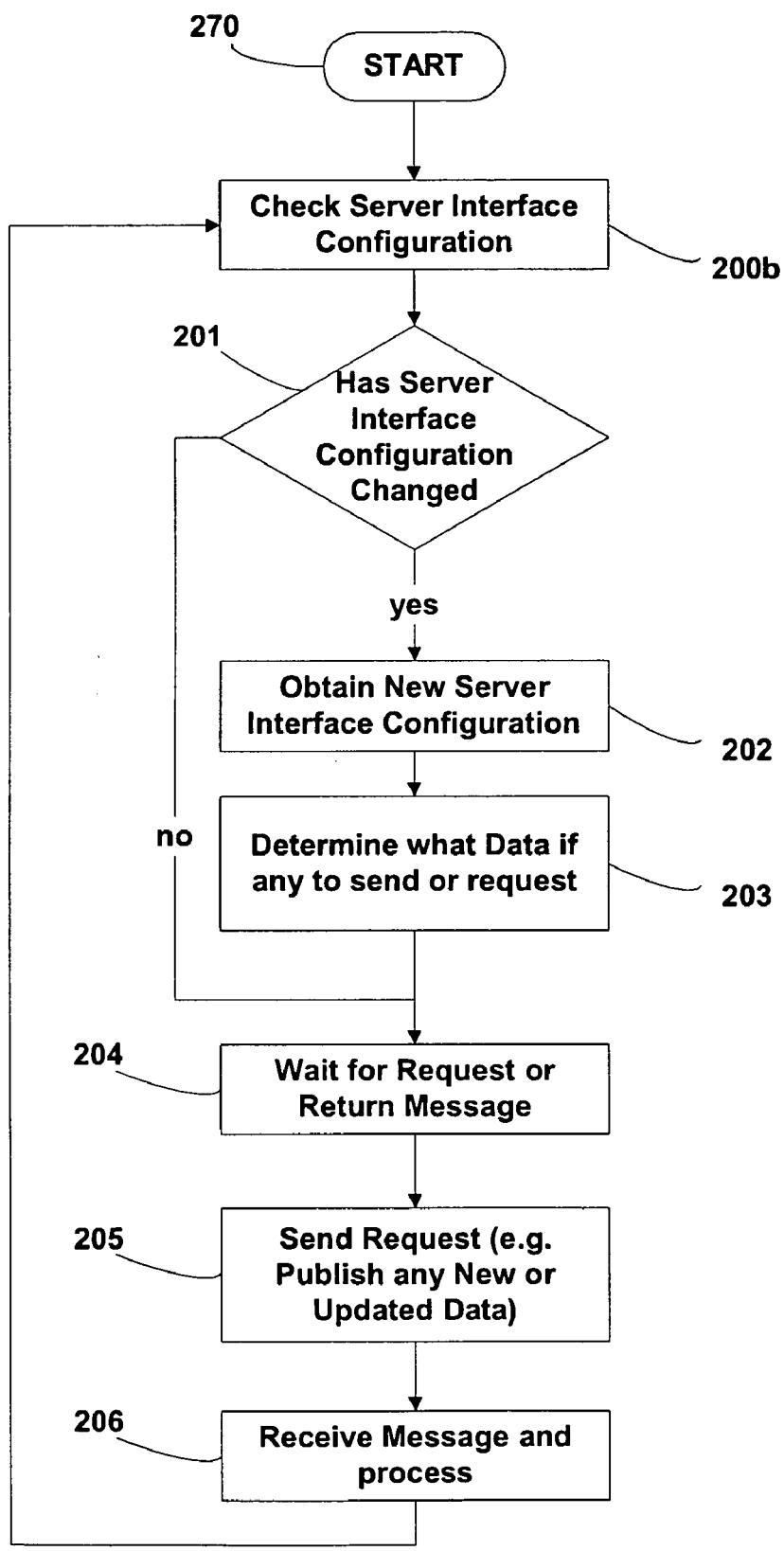
FIG. 2B illustrates a flow chart describing publication of data after dynamic updating of a declarative server interface configuration.

FIG. 2B illustrates a flow chart describing publication of data with dynamic updating of a declarative server interface configuration. One or more embodiments of the invention may dynamically check and update the server interface configuration at run-time. At a predefined interval or as shown before transferring data to or from the server interface, the server interface configuration is checked at 200b. If the server interface configuration has changed at 201, then the new server interface configuration is obtained at 202. If the server interface configuration has not changed then processing proceeds without updating the server interface configuration at 204. Optionally, GtinManager EJB 109 determines if there is any data that needs to be updated at 203 based on the new server interface configuration and automatically creates publication requests for updating the data pool. When a request for communication, for example a publication request by a user or automated system occurs, a server instance that has been initialized and is ready or waiting for an invocation at 204 performs the requested operation, in this case for example a publish request at 205. This process of sending requests such as the example publication request occurs forever until the server interface is deactivated. Messages received from the data pool at 206 are processed and may be parsed with incoming data stored in product content management system hosted on Accelerator Server 103 or alternatively the messages may be used to update the state of the last request and/or may be returned to GDS console 100 depending on the message. Messages returned to GDS console 100 are returned via Server Interface instance 108 and EJB Gtin-Manager 109 hosted on application server 101 in one or more embodiments of the invention.

The protocol used in communicating with a data pool in the GDSN is determined by the communication protocols accepted on that network, such as the AS2 communications standard for example. As the examples shown in FIGS. 2A and 2B have shown a publish request, any other message required to be sent to the data pool or the inverse operation of reading from the data pool is in keeping with the spirit of the invention. By inverse operation for retailers using the system it is meant for example that the retailer requests are subscribe requests instead of publish requests.

The following message types are required for communicating with the GDSN as of Aug. 1, 2004: Registry Catalogue Item, Catalogue Item Subscription, Catalogue Item Notification, Catalogue Item Confirmation, Response for Registry Catalogue Item, Party messages, Business Exception, Acceptance Acknowledgement, Catalogue Item Registration Acknowledgement, Receipt Acknowledgement. Of these messages, the "Catalogue Item Synchronization" message is the message that is used within the GDSN in order to publish data to a data pool. FIG. 3 illustrates an XML embodiment of a server interface configuration with regards to the format of a catalogue item synchronization message. The modification of an entity net weight for a given message as required by a particular data pool is accomplished by simply adding a declarative description of the required field to a message definition for a given data pool. For example, if the data pool now requires and attribute 300 named "notToExceedWeight" and the format for the attribute is "AN/2" for a particular message, then the server interface will send the attribute using the proper format when directed to do so. Note that in addition to coded format types of various standards bodies, general regular expressions are also available for field definitions. Any modification of the format of data or messages may be performed declaratively and dynamically while the system is running instead of recompiling and redistributing an application to multiple end users. If the originator of the call to Server Interface instance 108 does not send the required data or the data is in the wrong format, then an exception may be thrown alerting the user. Alternatively, the Server Interface may be able to handle the alteration if for example the data is present in the request or if the format may be modified at run-time to meet the needs of the interface, for example the order or cardinality of attributes in a message are altered. In addition, any of the data entries or related attributes may be filled from the main database 103 of FIG. 1 using a family hierarchy comprising a parent object or other construct as per one or more of the following patents, application or publications: U.S. patent application Ser. No. 10/990,292 to Vishnia-Shabtai et al., entitled "System And Method For Dynamically Constructing Synchronized Business Information User Interfaces" filed Nov. 15, 2004, is hereby incorporated by reference. U.S. patent application Ser. No. 10/990,293 to Cherny et al., entitled "Accelerated System And Methods For Synchronizing, Managing, And Publishing Business Information" filed Nov. 15, 2004, is hereby incorporated by reference. U.S. patent application Ser. No. 09/577,268 to Hazi et al., entitled "Timeshared Electronic Catalog System And Method" filed May 23, 2000, is hereby incorporated herein by reference. U.S. Pat. No. 6,754,666 to Brookler et al., entitled "Efficient Storage And Access In A Database Management System" filed Aug. 21, 2000, is hereby incorporated herein by reference. U.S. patent application Ser. No. 09/643,316 to Brookler et al., entitled "Data Indexing Using Bit Vectors" filed Aug. 21, 2000, is hereby incorporated herein by reference. U.S. patent application Ser. No. 09/643,207 to Weinberg et al., entitled "Data Editing And Verification User Interface" filed Aug. 21, 2000, is hereby incorporated herein by reference. U.S. patent application Ser. No. 09/960,902 published as Publication No. 20020087510 to Weinberg et al., entitled "Method And Apparatus For Structuring, Maintaining, And Using Families Of Data" filed Sep. 20, 2001, is hereby incorporated herein by reference. U.S. patent application Ser. No. 10/022,056 published as Publication No. 20020194196 to Weinberg et al., entitled "Method And Apparatus For Transforming Data" filed Dec. 12, 2001, is hereby incorporated herein by reference. U.S. patent application Ser. No. 09/960,541 published as Publication No. 20020116417 to Weinberg et al., entitled "Method And Apparatus For Dynamically Formatting And Displaying Tabular Data In Real Time" filed Sep. 20, 2001, is hereby incorporated herein by reference. U.S. patent application Ser. No. 10/172,572 published as Publication No. 20030233347 to Weinberg et al., entitled "Method And Apparatus For Generating And Utilizing Qualifiers And Qualified Taxonomy Tables" filed Jun. 13, 2002, is hereby incorporated herein by reference.

Figure 4:
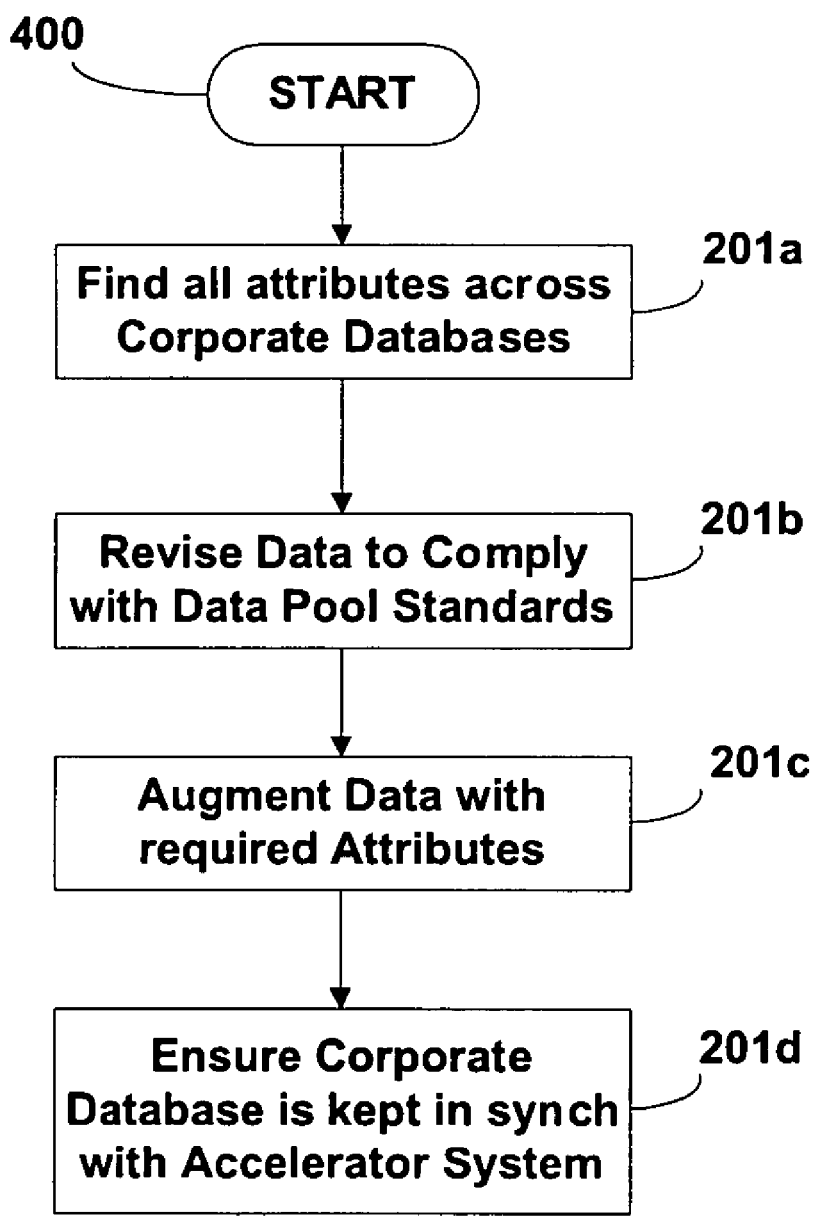
FIG. 4 illustrates a flow chart of the data cleansing process.

FIG. 4 illustrates a flow chart of the data cleansing process. The cleansing process occurs prior to synchronization data using the global data synchronization process in one or more embodiments of the invention. Processing starts at 400 and is shown for completeness. Data cleansing involves finding all of the data attributes across the enterprise that are to be shared in a data pool at 201a. The data attributes found to be of interest in sharing with outside companies is revised to comply with standards that allow the data to be inserted into a data pool at 201b. Any attributes not in the current enterprise system associated with a product for example are added at 201c. After this process is complete, the information technology department of a company is enlisted to ensure that the internal enterprise data is synchronized at 201d.

Thus embodiments of the invention directed to a global data synchronization dynamic server interface have been exemplified to one of ordinary skill in the art. The claims, however, and the full scope of any equivalents are what define the metes and bounds of the invention.

What is claimed is:

1. In a computer system, a method for dynamically modifying synchronized business information server interfaces comprising:

initiating a server interface corresponding to a data pool within a Global Data Synchronization Network;

obtaining a first server interface configuration comprising a declarative description of data attributes to be globally synchronized with said data pool, wherein said server interface is configured to use said first server interface configuration to communicate with said data pool;

communicating with a data pool specified by said first server interface configuration via said server interface, wherein communicating comprises transmitting and receiving messages conforming to said first server interface configuration;

determining if said first server interface configuration has changed;

obtaining a second server interface configuration;

replacing said first server interface configuration with said second server interface configuration, wherein new instances of said server interface use said second server interface configuration without recompiling and redistributing said server interface; and, communicating with a data pool specified by said second server interface configuration via said server interface, wherein communicating comprises transmitting and receiving messages conforming to said second server interface configuration.

2. The method claim of 1 further comprising:

determining whether to send or request new format compliant data complying with said second server interface configuration.

3. The method claim of 1 wherein obtaining said first server interface configuration comprises receiving a server interface configuration file, said method further comprising:

installing said server interface configuration file by an installation employee wherein said installation employee performs said installing by editing said server interface configuration file with a text editor and initializing said server interface.

4. A global data synchronization dynamic server interface computer system comprising:

a computer usable memory medium having computer readable program code embodied therein wherein said computer readable program code is configured to:

initiate a server interface corresponding to a data pool within a Global Data Synchronization Network;

obtain a first server interface configuration from said computer usable memory medium wherein said server interface is configured to use said first server interface configuration to communicate with said data pool;

communicate with a data pool specified by said first server interface configuration via said server interface, wherein communicating comprises transmitting and receiving messages conforming to said first server interface configuration;

determine if said first server interface configuration has changed;

obtain a second server interface configuration;

replace said first server interface configuration with said second server interface configuration, wherein new instances of said server interface use said second server interface configuration without recompiling and redistributing said server interface; and, communicate with a data pool specified by said second server interface configuration via said server interface, wherein communicating comprises transmitting and receiving messages conforming to said second server interface configuration.

5. The global data synchronization dynamic server interface computer system of claim 4 wherein said first server interface configuration is altered to match said second server interface configuration and new instances of said server interface use said second server interface configuration without recompiling and redistributing said server interface.

6. The global data synchronization dynamic server interface computer system of claim 4 wherein said computer readable program code is further configured to determine whether to send or request new format compliant data complying with said second server interface configuration.

7. The global data synchronization dynamic server interface computer system of claim 4 wherein obtaining said first server interface configuration comprises receiving a server interface configuration file, and said server interface configuration file is installed by an installation employee that edits said data pool specific interface configuration file with a text editor and initializes said server interface.

* * * * *